(12) United States Patent
Anson (10) Patent No.: US 7,333,238 B2
(45) Date of Patent: Feb. 19, 2008

(54) RENDERING A PRINTING DEVICE PIXEL MAP

(75) Inventor: Bryce L. Anson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 924 days.

(21) Appl. No.: 10/402,577

(22) Filed: Mar. 28, 2003

(65) Prior Publication Data

US 2004/0190017 A1    Sep. 30, 2004

(51) Int. Cl.
    *G06F 15/00* (2006.01)
(52) U.S. Cl. .................. 358/1.9; 358/1.2; 358/528; 358/451; 382/299; 382/298; 710/19
(58) Field of Classification Search .............. 358/1.9, 358/1.2, 528, 451; 382/299, 298; 710/19
    See application file for complete search history.

(56) References Cited

U.S. PATENT DOCUMENTS

| | | | | |
|---|---|---|---|---|
| 5,579,445 A | * | 11/1996 | Loce et al. | 358/1.2 |
| 5,704,020 A | * | 12/1997 | Hanyu et al. | 358/1.2 |
| 5,778,158 A | * | 7/1998 | Fujii et al. | 358/1.2 |
| 5,790,708 A | * | 8/1998 | Delean | 382/270 |
| 5,911,007 A | * | 6/1999 | Miyake | 382/233 |
| 6,172,766 B1 | * | 1/2001 | Honma | 358/1.2 |
| 6,184,997 B1 | * | 2/2001 | Hanyu et al. | 358/1.15 |
| 6,243,174 B1 | * | 6/2001 | Fukasawa | 358/530 |
| 7,046,863 B2 | * | 5/2006 | Chang et al. | 382/299 |
| 7,123,768 B2 | * | 10/2006 | Mori | 382/181 |
| 2004/0150841 A1 | * | 8/2004 | Lieberman et al. | 358/1.2 |

* cited by examiner

*Primary Examiner*—Twyler Lamb
*Assistant Examiner*—Jacky X. Zheng (57) ABSTRACT

A device and method to render a page in a printing device are described. In an implementation, an object to be rendered onto the pixel map is converted from a description in pixel coordinates to a representation in lower resolution surface units. The lower resolution surface units are compared to a lower resolution map of the page. If the representation does not overlap an object in the lower resolution map, then an indication is formed that the object can be rendered on the pixel map without destination dependent operations.

30 Claims, 6 Drawing Sheets

RENDERING A PRINTING DEVICE PIXEL MAP

TECHNICAL FIELD

This invention relates generally to a printing device and more particularly but not exclusively, relates to methods and systems to rasterize an image for a printing device.

BACKGROUND

A printing device often receives an image specification in the form of objects or object descriptions. For example, an image might be specified in terms of graphical shapes such as lines, boxes, circles, characters, etc.. These objects or object descriptions are received sequentially, and might overlay each other on the printed page.

Most printing devices are raster-type devices, meaning that they apply a raster image to a printed medium. A raster image comprises a two-dimensional array of picture elements or "pixels." When printing, a printing device converts received graphics objects into raster images. The printing device generates the raster image by sequentially rendering received objects onto a high resolution pixel map (commonly termed a "bit map"). Each pixel rendered onto the high resolution pixel map is represented by several bytes to store such information as intensity, grey scale, color plane, and the like.

In sequentially rendering each object onto the high resolution pixel map, the printing device may perform operations that depend upon whether any pixels affected by the in-process object have already been rendered onto the pixel map during the rendering of a previous object. Such operations are commonly referred to as destination dependent operations. These operations may include, for example, color blending, foreground/background processing, and transparency processing.

BRIEF DESCRIPTION OF THE DRAWINGS

FIG. 11 is a flow chart portraying an exemplary method of rendering objects on a pixel map by a printing device, based on first determining whether a given region of the page has been written to, and second rendering onto the pixel map with or without regard to destination dependent operations based on whether the given region of the page has been written-to.

DETAILED DESCRIPTION

This description describes embodiments of a system and a method to render at least one object on a page. In the described embodiments, the objects comprise vector objects and character objects, which when rendered, can be printed on a page. This description refers to destination dependent operations. Destination dependent operations are operations, such as color blending, foreground/background processing, and transparency processing, that depend upon whether any pixels at that destination, or location, have been rendered by a previous object. Thus, if an operation is associated with pixels in an area (a "destination") of the page wherein no object has previously been rendered, the operation is not destination dependent. However, if the operation is associated with pixels in an area or destination of the page wherein an object has previously been rendered, the operation is destination dependent (in that aspects of the previous rendering must be addressed).

Figure 1:
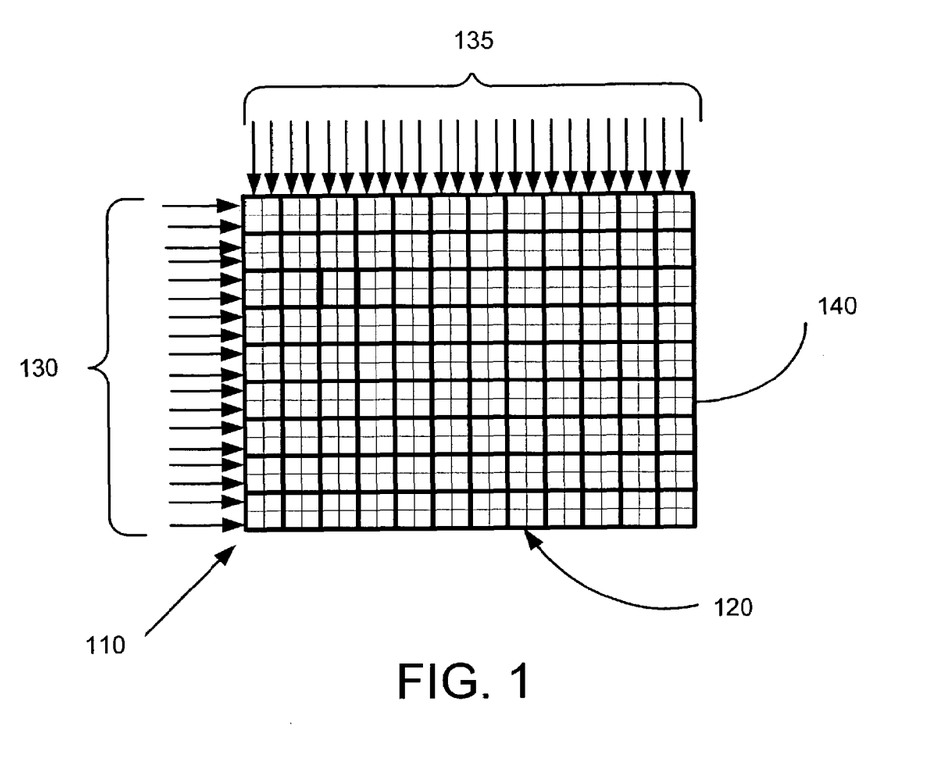
FIG. 1 portrays an exemplary pixel map to represent an image of a page in a printing device. Each individual pixel is portrayed, but not the quantity of bits that represent each pixel.

Referring to FIG. 1, a page image is represented in a printing device as a rasterized high resolution pixel map 110 having multiple exemplary individual pixels 120. The pixels 120 are generally arranged in a grid or two-dimensional array, organized in rows 130 and columns 135 on a Cartesian x-y coordinate system. Each pixel is represented in pixel map 110 by multiple bits to represent such pixel qualities as color, gray scale, intensity, and color plane. In the high-resolution pixel map, each pixel or array location corresponds to a specific pixel to be printed on a print medium.

Six hundred pixels per inch (commonly known as dots per inch or dpi) in each of the x and y directions is a common print density. At this density, an individual pixel represents a space $1.667 \times 10^{-3}$ inches in each direction on the page. An entire 8½×11 inch page is thus represented by $3.36 \times 10^8$ pixels.

The pixel map is conceptually partitioned into individual regions, sections, partitions, or the like, such as partition 140. In FIG. 1, each partition 140 is delineated by a heavy-lined box. Each partition 140 is illustratively depicted as encompassing a two-by-two array of four pixels. However, it is to be understood that in the illustrative pixel map 110, each partition 140 can be delineated for any size pixel array deemed necessary or desirable for the particular printing device. For example, for the rasterizing components in some printing devices it may be desirable to delineate partitions 140 that each cover a 160-by-160 array of $25.6 \times 10^3$ pixels.

Figure 2:
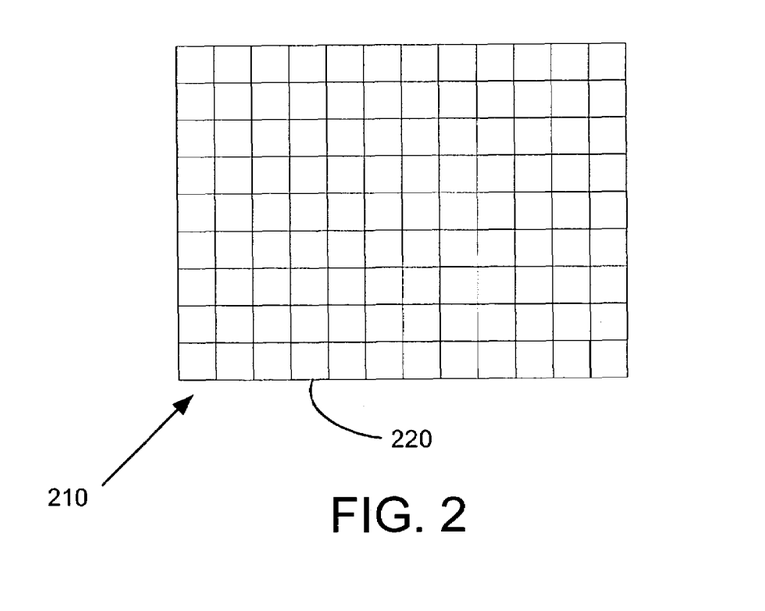
FIG. 2 portrays an exemplary map to represent an image of a page that has a lower resolution than a pixel map, termed herein a lower resolution map.

Referring to FIG. 2, the printing device maintains a lower resolution map 210 having array positions corresponding to the delineated partition of pixels shown in FIG. 1. Thus, each partition (hereinafter cell) of the lower resolution map 210, such as cell 220, corresponds to multiple pixels of a specific partition 140 in the higher resolution pixel map 110. The lower resolution map 210 is used to determine whether specific partitions 140 of the pixel map 110 have already been rendered. Specifically, each cell 220 of lower resolution map 210 may be represented by fewer bits than each partition 140 in the pixel map 110, and specifically may be represented by a single bit, that indicates whether any of the pixels represented by that cell have already been rendered on the pixel map. When rendering new objects to the pixel map 110, the printing device rendering components can refer to the low-resolution map 210 to determine whether operations need to be performed in a destination dependent manner.

More specifically, as objects are rendered to pixels of the high resolution pixel map 110, the printing device sets corresponding cells 220 of the low-resolution map 210. Each cell 220 of the lower resolution map 210 indicates that at least one pixel 120 of the corresponding pixel map partition has been rendered in the pixel map 110. Prior to rendering to any particular pixel of a partition 140 of the pixel map 110, the printing device checks the corresponding cell of the lower resolution map 210 to determine whether any pixels of that partition have already been rendered. If not, rendering operations can proceed on that partition without the need for destination dependent operations. Otherwise, the rendering operations are performed in a destination dependent manner, with appropriate retrieval of previously rendered data from the high resolution pixel map 110.

The lower resolution map 210 may have as few as one bit, or other element or value, corresponding to each partition of pixel map 110. Thus, an object's representation in the lower resolution map 210 will involve fewer cell elements than are required to represent the same object in the pixel map 110. As an example, each cell of lower resolution map 210 might illustratively represent 150 pixels in each direction, which corresponds to a dimension of 0.25 inches in each direction on the printed page. An entire 8½ by 11 inch page is thus represented by $3.36 \times 10^8$ pixels 120, representing 1,496 sections 140 of the pixel map 110, and corresponding to 1,496 cells 220 of the lower resolution map 210.

Utilization of the lower resolution map 210 in this manner allows the rendering process to reduce or minimize the amount of overhead required by destination dependent operations. When a destination dependent rendering operation affects a given area, it is only needed to check the relatively few corresponding elements of the lower resolution map 210 to determine whether the area has previously been rendered, rather than checking the much more numerous elements of the high resolution map 110 that correspond to the same area.

Figure 3:
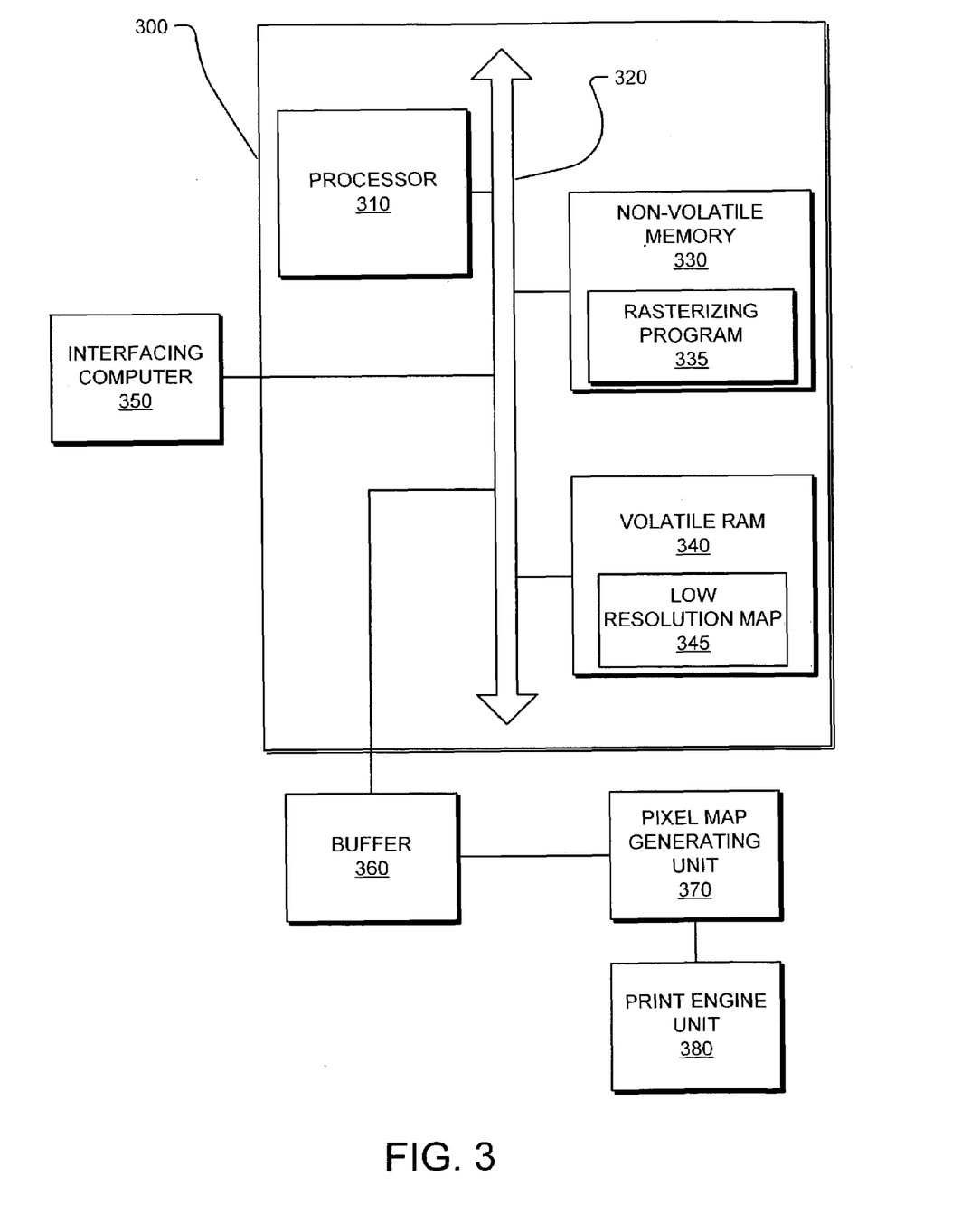
FIG. 3 a block diagram of an exemplary printing device system having an exemplary implementation of a printing device rasterizing circuit.

FIG. 3 shows an implementation of a printing device rasterizing circuit 300 to render a page pixel map from received object descriptions. The circuit 300 includes a memory 330 to store a rasterizing program 335. The memory 340 is implemented here as a non-volatile memory. The rasterizing program 335 comprises instructions to be executed by a processor 310 in operation of the printing device. The memory 330 is coupled to the processor 310 by a computer bus system 320. The processor 310 is itself illustratively a general purpose computer capable of executing program instructions on data. An exemplary operation of the rasterizing program 335 instructions is described in detail with reference to FIGS. 10-12 The program 335 includes instructions that when executed by the processor 310, cause the processor 310 to determine whether the printing device is to rasterize an in-process object with regard to, or accounting for, destination dependent operations; or to rasterize an in-process object without the need for destination dependent operations, as if the pixel map was a blank pixel map.

The circuit 300 includes a random access memory (RAM) 340. The RAM 340 is coupled to the processor 310 by the computer bus system 320. The RAM stores a lower resolution map 345, the lower resolution map 345 so named because it has a lower resolution than the page pixel map. In operation of the printing device rasterizing circuit 300, and described below with reference to FIGS. 10-12, each object that is drawn (or written-to or rendered) to a page pixel map (commonly referred to in the art as a raster image or a bit map), is also drawn to the lower resolution map 345. Generally, more than one pixel of the pixel map maps into each cell (or sub-region) of the lower resolution map 345. Each cell of the lower resolution map 345 corresponds to a given section or partition of the pixel map.

Each pixel may be represented by many color planes, each generally comprising a plural number of bytes. In contrast, each lower resolution map cell may be represented by only a single plane, implemented by as little as a single memory bit, and in one implementation at a separately addressable region of memory such as at a word address, or at a byte address. Each cell can correspond to a section of the pixel map having a dimension of $2_X$ pixels by $2^Y$ pixels, both X and Y being positive integers, so that a pixel can be converted to its corresponding cell by a bit shift operation.

The lower resolution map cells may correspond to a two-valued representation that can be portrayed by a single bit representation of a cell, such as a "marked" value or an "unmarked" value. A "marked" value indicates that a lower resolution cell is written-to, meaning that an already processed object's rendering onto the lower resolution map 345 includes the lower resolution cell. An "unmarked" value indicates that a lower resolution cell is not written-to, meaning that no other already processed object's rendering onto the lower resolution map 345 includes the lower resolution cell, and that no other already processed object's rendering includes the corresponding pixels in the pixel map.

In operation, an interfacing host computer 350 is coupled to the processor 310 by the computer bus system 320. The host computer 350 is to generate data to be printed by the printing device. The host computer 350 outputs the data to the printing device rasterizing circuit 300. The data output from the host computer 350 to the printing device rasterizing circuit 300 is commonly in the form of page description language output data codes. Page description language output data codes represent a page to be printed as a collection of objects. The objects are represented as coded commands, such as a coded text character or an analytic representation of a geometrical object, rather than as a bit map. The location of each object is defined in reference to the pixel map pixel coordinate system. Common page description languages at this time include "Postscript" (a registered trademark of Adobe Systems Incorporated), "Printer Control Language" (or PCL, a registered trademark of Hewlett-Packard Company), and raster operations (ROPS) such as those defined in the "Windows 98" (a registered trademark of Microsoft Corporation) operating system.

In operation, the rasterizing program 335 is loaded into the RAM 340, and executes from the RAM 340. In an implementation in which the rasterizing program 335 executes from the RAM 340, the rasterizing program 335 is commonly stored in the non-volatile memory 330 in a compressed form, then decompressed during an initial operation of the printing device, and then stored in the RAM 340 in its decompressed form for execution. In an implementation, the rasterizing program may also be executed from the non-volatile volatile memory 330. The RAM 340 stores the lower resolution pixel map 345.

In operation of the printing device rasterizing circuit 300, and described below with reference to FIGS. 10-12, for each object received from the host computer 350 by the rasterizing circuit 300, the processor 310, under the control of the rasterizing program 335, converts an object description referenced to the pixel coordinate system into a lower resolution cell representation of the object. The objects described by the lower resolution cell representation of the object is compared to a lower resolution map of the page. If any of the cells in the representation of the object in lower resolution cells does not correspond to any destination cells in the lower resolution map, then the object does not overlap with any object rendered in both the lower resolution map and the pixel map. Therefore, an indication is formed that the object can be rendered on the pixel map without destination dependent operations. A destination cell is a cell that represents an already rendered object in the lower resolution map A processing circuit to render the higher resolution pixel map is implemented as the pixel map generation unit 370. In one implementation, the pixel map generation unit includes the processor 310 responding to the instructions of a stored program. The pixel map generation unit 370 interprets the object downloaded from the host computer 350 into a pixel representation of the object. If an indication has been formed that the object can be rendered on the pixel map without destination dependent operations, the pixel map generation unit 370 renders the object onto the pixel map without regard to destination dependent operations. If an indication has not been formed that the object can be rendered on the pixel map without destination dependent operations, the processing circuit renders the object onto the pixel map accounting for destination dependent operations. The processing circuit in other implementations may be a dedicated circuit or may be a different processor.

Commonly, the pixel map generation unit 370 to render the pixel map describes the pixel map in portions and operationally stores these portions in a buffer circuit 360. Commonly, the pixel map generation unit 370 compresses each portion of the pixel map, and outputs these compressed portions to a print engine hardware unit 380. The processing circuit interprets the object downloaded from the host computer 350 into a pixel representation of the object. If an indication has been formed that the object can be rendered on the pixel map without destination dependent operations, the processing circuit renders the object onto the pixel map without regard to destination dependent operations. The processing circuit in other implementations may be a dedicated circuit or may be a different processor. The print engine hardware 380 maintains a compressed pixel map, and selectively decompresses the map and controls a print engine to print on a page the raster image stored in the decompressed pixel map.

Figure 4:
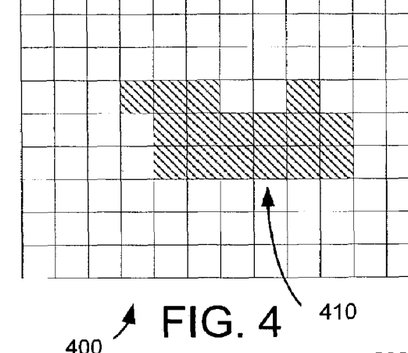
FIG. 4 portrays an exemplary lower resolution map rendering of an object depicted in FIG. 5.
Figure 5:
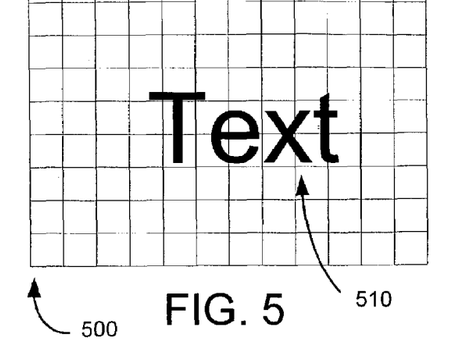
FIG. 5 portrays a pictorial representation of an exemplary higher resolution object superimposed on an exemplary lower-resolution grid.

The process of rendering a lower resolution object is graphically portrayed with reference to FIGS. 4-9. Referring to FIGS. 4 and 5, a lower resolution map 400 includes "marked" cells 410. Illustratively, these lower resolution "marked" cells 410 could have been rendered onto the lower resolution map 400 from an object portrayed as an Arial "Text" object 510 superimposed on a lower resolution coordinate system 500.

Figure 6:
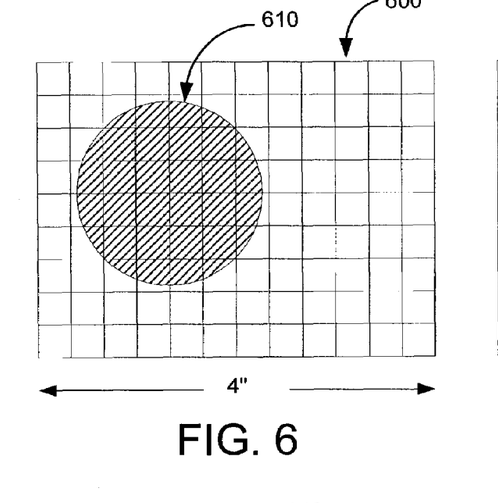
FIG. 6 portrays a pictorial representation of an exemplary higher resolution circle object downloaded in a page description language to an exemplary printing device rasterizing circuit, superimposed on an exemplary lower resolution grid.
Figure 7:
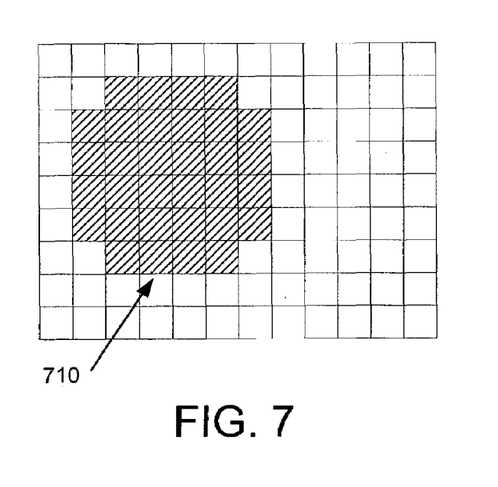
FIG. 7 portrays an exemplary rendering in lower resolution exemplary surface sections of the circle object depicted in FIG. 6.

Now referring to FIG. 6, a circle object 610 whose description is downloaded from the interfacing host computer 350 described in high resolution coordinates is to be rendered on a pixel map by a printing device. The circle object 610 is portrayed in high resolution pixels superimposed on an illustrative lower resolution coordinate system 600. Initially, under the operation of the rasterizing program 335, the circle object 610 is initially converted to a lower resolution cell representation 710. The lower resolution coordinate system 600 is illustratively portrayed as a 4 cells per inch×4 cells per inch grid, having individual cells $2.5 \times 10^{-1}$ inch by $2.5 \times 10^{-1}$ inch, superimposed here by the circle object 610. Referring to FIG. 7, the circle object 610 is converted into a lower resolution cell representation graphically portrayed by the lower resolution cell circle 710.

Figure 8:
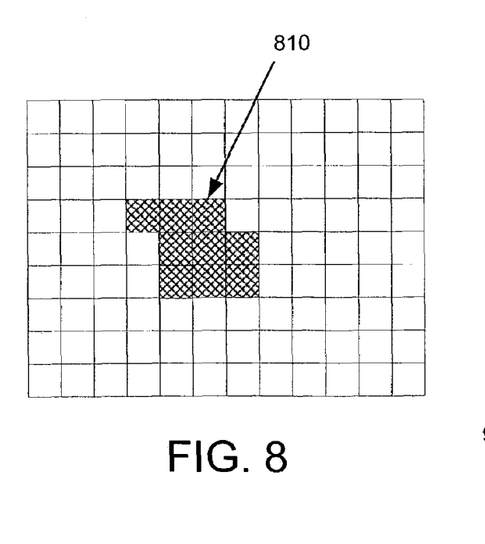
FIG. 8 portrays the surface sections (or sub-regions or cells) that are in common in both the lower resolution map depicted in FIG. 4, and the exemplary lower resolution representation of the circle object depicted in FIG. 7.
Figure 9:
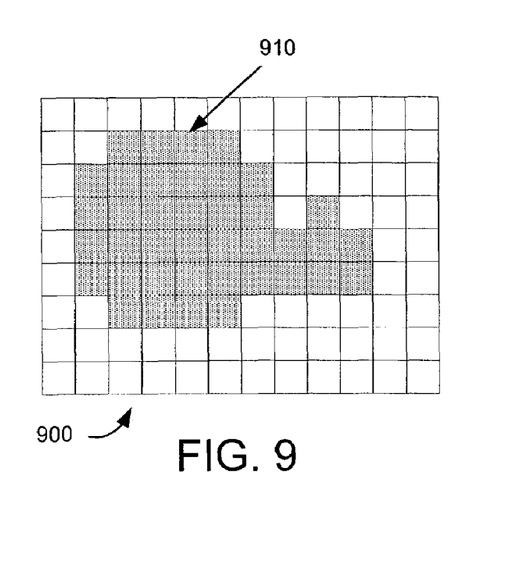
FIG. 9 portrays the exemplary lower resolution map depicted in FIG. 4 after it is updated to include the cells of the lower-resolution representation of the circle object depicted in FIG. 7.

The cells of the lower resolution circle rendering 710 are compared to the "marked" cells stored in the lower resolution map 400 shown in FIG. 4. Referring to FIG. 8, the comparison determines that cells 810 of the lower resolution circle 710 are "marked" cells of the lower resolution map 400. Referring to FIG. 9, the lower resolution map 900 is updated to include the cells of the lower resolution circle 710, portrayed as the "marked" cells 910 on the updated lower resolution map 900.

Figure 10:
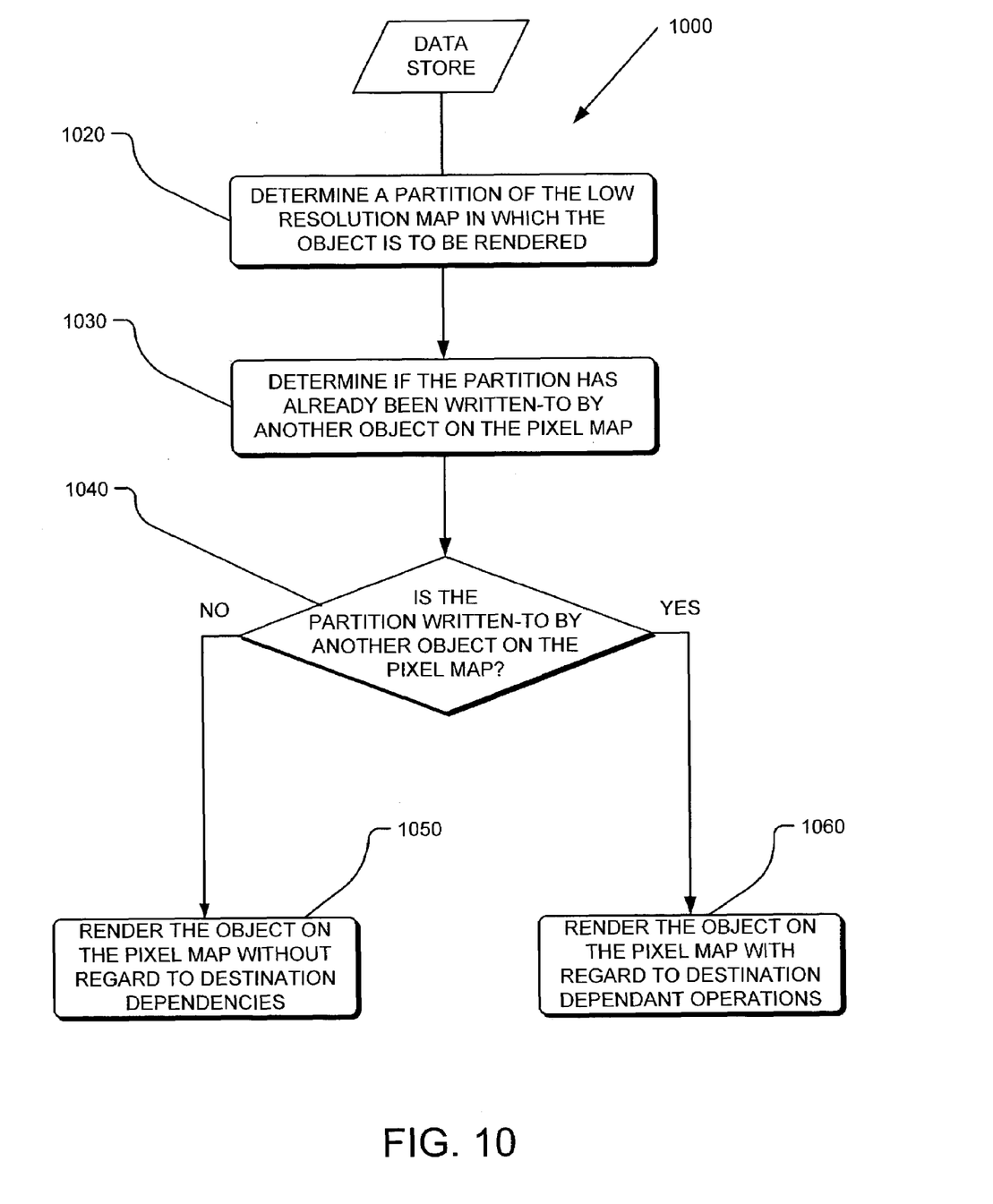
FIG. 10 is a flow chart portraying an exemplary method of rendering objects on a pixel map.

FIG. 10 portrays a method 1000 of rendering objects on a pixel map by first determining if an object overlaps a previously marked region of the pixel map, and if not, then rendering the object on the pixel map without regard to destination dependent operations. In block 1020, a processor 310 (FIG. 3), under the control of a rasterizing program 335 (FIG. 3), processes an object from a data store and determines a partition of the lower-resolution map 345 (FIG. 3) in which the object is to be rendered. Each object from the data store may not be identical to a representation of an object that is input into the printing device (such as in a page description language data code), though still described by the input (such as a page description language) representation. Illustratively, an object(s) to be processed by the method 1000 may be converted from an input object(s) by compacting or segmenting the input object(s) into at least one other object. For instance, an input object may be converted by the printing device into a multiple number of horizontal or vertical objects (or subdivisions thereof) for processing by the method 1000, so as to more efficiently render the object in a printing device that renders on a horizontal line, or a vertical line, basis.

In block 1030 the processor 310 determines if that partition of the lower resolution map 345 is already written-to by another object. The method includes a comparison of the cells in the lower-resolution representation of the object with the "marked" valued cells in the lower resolution map. Because a lower resolution representation of an object has fewer individual cells than a higher resolution pixel representation has pixels, the processor performs fewer operations in processing a low resolution representation where there are marked cells than it would if it were processing pixels.

If the partition of the lower resolution map 345 is not already written-to, (i.e. the "NO" branch of block 1040), the processor 310 renders the object on the pixel map as if the pixel map were blank, that is without regard to, or without accounting for, destination dependent operations (block 1050). Conversely, if the partition of the lower resolution map 345 is already written-to, (i.e. the "YES" branch of block 1040), the processor 310 renders the object on the pixel map with regard to, or accounting for, destination dependent operations (block 1060). The acts depicted here with respect to blocks 1020-1060 are to be repeated for each object to be processed.

Figure 11:
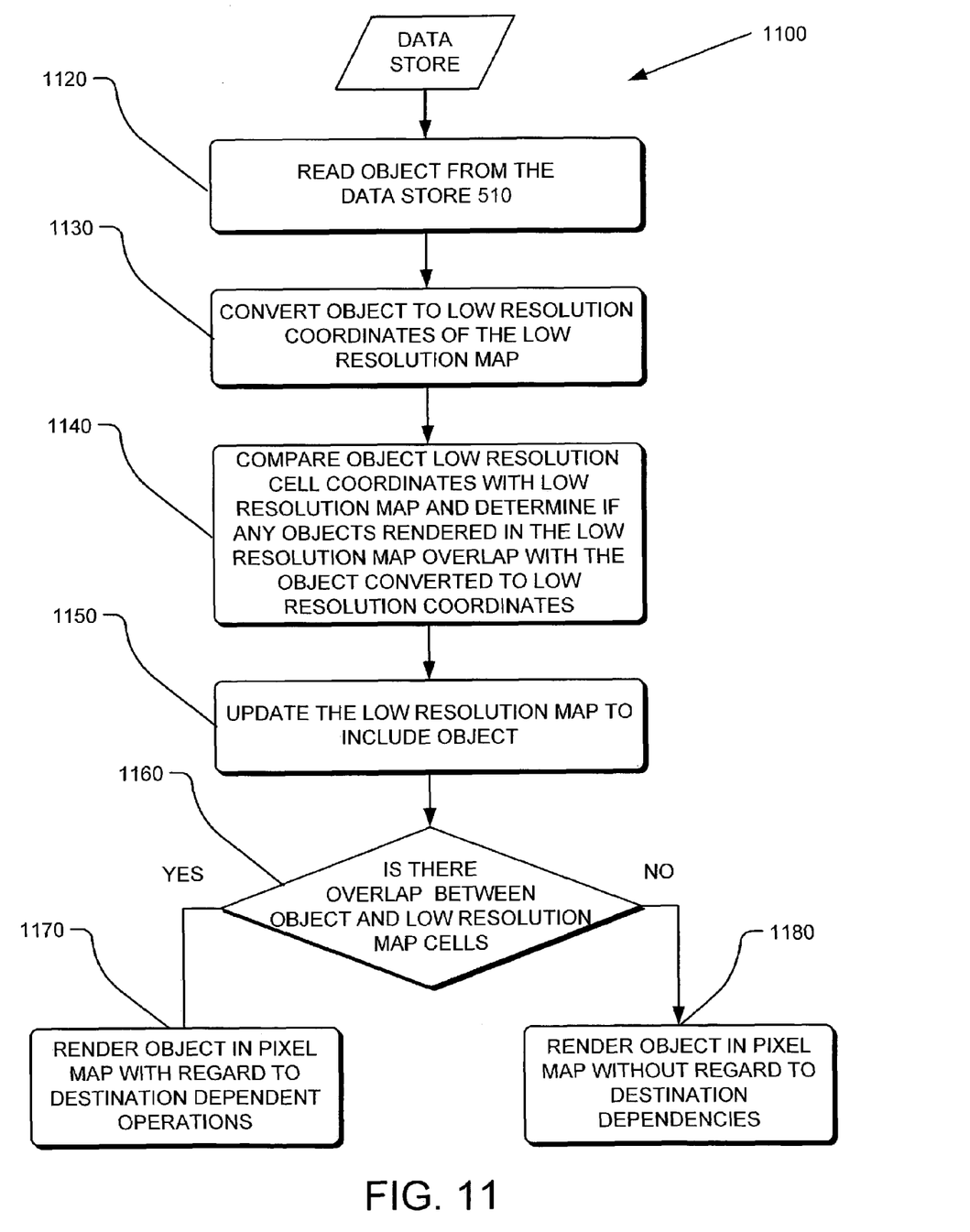

In FIG. 11, an illustrative implementation of the method depicted with reference to FIG. 10 is shown. The lower resolution map 345 is described having each cell represent a partition of the pixel map, and an object description is converted into a representation in lower resolution cells. Accordingly, the lower resolution map is a representation of cells, each cell corresponding to at least one pixel on the pixel map. In block 1120, the processor 310 under the control of the rasterizing program 335, reads an object from a data store 1110. The object is described in the higher resolution page pixel map coordinate system. In block 1130, the object's description is converted from the higher resolution page pixel map coordinate system to the lower resolution coordinate system of the lower resolution map 345. For fast conversions, each dimension of the lower resolution map 345 should be ½″ times the corresponding dimension of the high resolution pixel map, "n" representing an integer, where it is meant that "n" may be different in each dimension, so that a bit shift operation will be sufficient to convert any high resolution coordinate to its corresponding low resolution coordinate. In block 1140, the cells of the lower resolution representation of the object are compared with a lower resolution map to determine if the object in the lower resolution representation overlaps with any of the objects already rendered on the lower resolution map. "Overlap" here means that two objects have at least one cell in common. This could be accomplished by comparing each lower resolution cell (or sub-region) of the object, in order, with the corresponding cell in the lower resolution map 345. In block 1150, the lower resolution map 345 is updated with the cells representing the object, in order to process a subsequent object according to the process portrayed in FIG. 11. A detailed implementation of the method of blocks 1140 and 1150 is portrayed with reference to FIG. 12, and graphically illustrated with reference to FIGS. 4-9 above.

If there is overlap between the low resolution representation of the object with any of the objects already rendered on the lower resolution map (i.e. "YES" in block 1160), the processing circuit to render the pixel map renders the object described in higher resolution page coordinates, provided by the data store 1110, onto the pixel map (block 1170). The object is rendered onto the pixel map taking into account that at least one pixel of the object is included in an already rendered object, so that the object is rendered with regard to, or accounting for, destination dependent operations. If there is no overlap between the low resolution representation of the object with any of the objects already rendered on the lower resolution map (i.e. "NO" in block 1160), the processing circuit to render the pixel map renders the object from the data store 1110 under the assumption that the page is blank, without regard to destination dependent operations. The processing in block 1180, rendering without regard to destination dependencies, should be a faster algorithm than the processing in block 1160, rendering with regard to destination dependencies.

The acts depicted here with respect to blocks 1120-1180 are to be repeated for a plural number of objects to be sequentially rendered on the pixel map 345.

Figure 12:
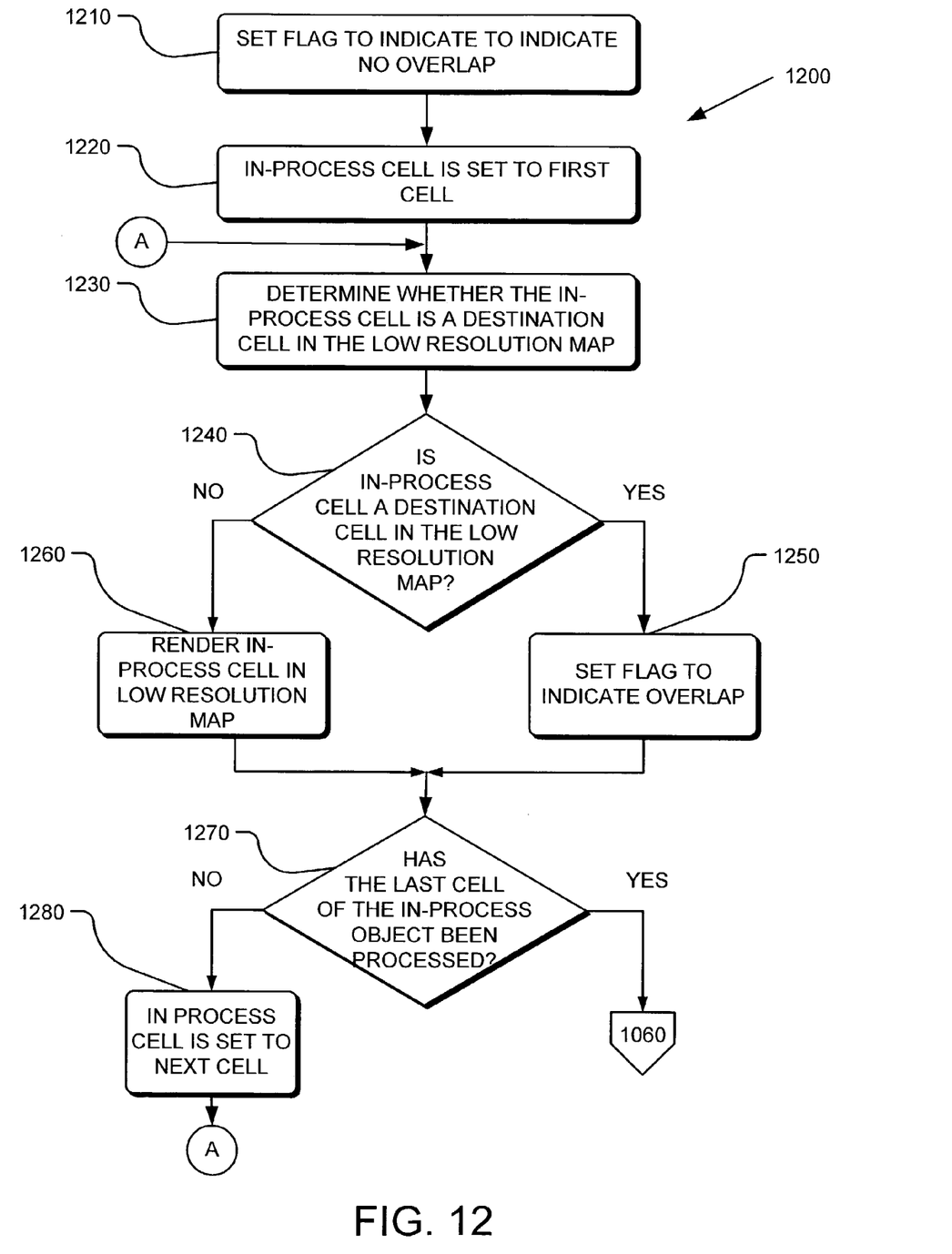
FIG. 12 is a flow chart portraying an exemplary method of determining if any of the objects rendered in a lower resolution map represent a region of the page overlapping with an in-process object represented in lower resolution coordinates.

FIG. 12 shows a method of determining if any of the objects rendered in a lower resolution map represent a partition of the page overlapping with an in-process object represented in lower resolution coordinate cells. In Block 1210, a flag to indicate whether there is overlap with the object and the objects already rendered in the lower resolution map 345 is nominally set to a default setting, to indicate that there is no overlap between the object and the objects already rendered in the lower resolution map 345.

In block 1220, a first cell of the in-process object is set for processing as the in-process cell. In block 1230, the in-process cell is compared with the lower resolution map 345, to determine whether there is a destination cell at the corresponding cell of the lower resolution map 345. In an implementation, this is performed by flagging each cell position in the lower resolution map 345 either as a cell of an object already rendered in the lower resolution map 345, or as not a cell of an object already rendered in the lower resolution map 345, conveniently as a "marked" value cell or as an "unmarked" value cell respectively, as described with reference to the lower resolution map 345 and block 1030 in FIG. 10.

In block 1250, the flag to indicate whether there is an overlap with the object and objects already rendered in the lower resolution map 345 is set to indicate overlap if the in-process cell is already a destination cell in the lower resolution map 345 (i.e. the "YES" branch in block 1240). In block 1260, the in-process cell is rendered in the lower resolution map 345 if the in-process cell is not a destination cell in the lower resolution map 345 (i.e. the "NO" branch in block 1240). The in-process cell can be rendered regardless of whether or not it was already there, as long as the flag to indicate an overlap is set whenever there is rendering on top of a destination cell. In decision block 1270, if the last cell has been processed, control passes to decision block 1060 of FIG. 10. In decision block 1270, if the last cell has not been processed, control passes to block 1280. In block 1280 a next cell of the in-process lower resolution object is set for subsequent processing as the in-process cell and control passes to block 1230.

The printing device is not limited in its application to the details or construction and the arrangements of components set forth in the description or illustrated in the drawings. It is capable of other implementations. Also, the phraseology and terminology used herein is for the purpose of description and should not be regarded as limiting. The language in the patent claims may not capture every nuance of the printing device or describe with complete precision the range of its novelty. The scope is not limited to its literal terms but instead embraces all equivalents of the claims described. It is understood that the depicted acts in any described method are not necessarily order dependent, and in an implementation there may be intervening acts.

I claim:

1. A method comprising:
   forming a cell map comprising a representation of an object to be printed on a printing device, wherein the cell map has a lower resolution than a pixel map comprising a representation of the object, wherein each cell of the cell map corresponds to multiple pixels on the pixel map;
   determining a partition of the cell map in which the object is to be rendered;
   determining if the partition has already been written-to in the course of a previous rendering of another object:
   if the partition has previously been written-to, then rendering the representation of the object in the pixel map with regard to the previous rendering;
   if the partition has not previously been written-to, then rendering the representation of the object in the pixel map without regard to any previous rendering; and printing the rendered representation of the object on the printing device.

2. The method defined in claim 1 wherein determining if the partition has already been written to in the course of a previous rendering of another object comprises setting a flag to indicate overlap of two objects.

3. The method defined in claim 1 further comprising:
updating the cell map after rendering each object.

4. The method defined in claim 3 further comprising repeating the determining steps and the rendering steps for multiple objects.

5. The method defined in claim 1, wherein rendering the representation of the object in the pixel map with regard to the previous rendering comprises rendering the object using color blending, foreground/background processing and transparency processing with regard to the previous rendering.

6. The method defined in claim 1, wherein each cell of the cell map is associated with more than one pixel in the pixel map.

7. The method defined in claim 1 further comprising updating each cell in the cell map with data indicating objects associated with one or more cells have been rendered in the pixel map.

8. The method defined in claim 1 wherein the cell map has a resolution in any coordinate of $\frac{1}{2^n}$ of the pixel map, n being an integer.

9. The method defined in claim 1 wherein each said cell corresponds to a section of said pixel map having a dimension of $2^X$ pixels by $2^Y$ pixels, wherein both said X and said Y are integers.

10. A method of, comprising:
determining a partition of a low resolution map associated with an object to be rendered;
determining if the partition has already been written to when another object was rendered;
if the partition has previously been written to, then rendering the representation of the object in a pixel map with regard to the previous rendering;
if the partition has not previously been written to, then rendering the representation of the object in the pixel map without regard to any previous rendering; and
printing the rendered representation of the object on the printing device.

11. A method as described in claim 10 further comprising repeating the acts of determining and rendering for multiple objects.

12. A method as described in claim 10 wherein the partition corresponds to predetermined pixels in the pixel map.

13. A method as described in claim 10 further comprising converting an object description into a representation having at least one sub-partition of said partition, each said sub-partition corresponding to at least one pixel.

14. A computer readable medium having stored thereon a plurality of instructions that, when executed by at least one processor, cause the processor to perform acts comprising:
converting from an object described in pixel coordinates into an object representation in at least one cell, each cell representing an area corresponding to a multiple quantity of pixels of a pixel map;
forming an indication that the object is to be rendered on the pixel map without regard to destination dependent operations if all of the cells of the object representation are not written-to in a cell map;
updating the cell map to include the cells of the object representation as written-to; and
printing a rendered representation of the object on a printing device.

15. The computer readable medium defined in claim 14 wherein the instructions further cause the processor to repeat the converting, the forming, and the updating, for multiple objects.

16. The computer readable medium defined in claim 14 wherein the instructions further cause the processor to perform, if any of the cells of the object representation are written-to in the cell map, forming an indication that the object is not to be rendered on the pixel map with regard to destination dependent operations.

17. The computer readable medium defined in claim 14 wherein each of the cells of the cell map that is written to is represented in a memory by data indicating the cell is written-to.

18. The computer readable medium defined in claim 14 wherein each cell of the cell map has a resolution in a coordinate of $\frac{1}{2^n}$ of the resolution of each pixel in the pixel map, n representing an integer.

19. A rendering system to render a printing device pixel map comprising:
a processor; and
a memory to store a cell-based map arranged according to cells to describe each cell written to by an object, each cell corresponding to a plural number of pixels in the pixel map, and to store a plurality of instructions that when executed by the processor, cause the processor to perform acts comprising:
converting a description of an object to from pixel coordinates into a cell-based map;
determining whether at least one cell of the representation was previously written-to on the cell-based map;
if no cells of the representation are written-to on the cell-based map, rendering the object in the pixel map without regard to destination dependent operations;
subsequent to the determining, storing for each cell of the representation in the cell based map, an indication that the cell is written-to in the cell-based map; and
printing the rendered representation of the object on the printing device.

20. The rendering system defined in claim 19 further comprising a pixel map generation unit to render the object on the pixel map if cells of the representation are written-to on the cell-based map.

21. The rendering system defined in claim 19 further comprising a circuit to couple a host computer to the processor to receive the description of the object according to pixel coordinates.

22. The rendering system defined in claim 19 wherein the cell map has a resolution in a coordinate of $\frac{1}{2^n}$ of the pixel map, n representing an integer.

23. The rendering system defined in claim 19 wherein each cell is represented by fewer bits than each pixel of the in the pixel map.

24. The rendering system defined in claim 19 wherein each cell is represented by one bit.

25. A printing device comprising:
first means for determining a partition of a low resolution map associated with an object to be rendered;
second means for determining if the partition has already been written to when another object was rendered;
third means for, if the partition has previously been written to, rendering the representation of the object in a pixel map with regard to the previous rendering;

fourth means for, if the partition has not previously been written to, rendering the representation of the object in the pixel map without regard to any previous rendering; and fifth means for printing the rendered representation of the object on the printing device.

26. A printing device as described in claim 25 additionally comprising means for updating the low resolution map after rendering each object.

27. A printing device as described in claim 25 further comprising means to maintain said map by converting the cells representing the object into destination cells in the map.

28. A printing device as described in claim 25 wherein each of the cells in the map is described by one of being a destination cell and not being a destination cell.

29. A printing device as described in claim 25 wherein the cells each have a resolution in a coordinate of $\frac{1}{2}^n$ of the described pixels, n representing an integer.

30. A printing device as described in claim 25 further comprising fourth means to couple a computer to said second means wherein the computer generates the object described according to pixels.

* * * * *

UNITED STATES PATENT AND TRADEMARK OFFICE
CERTIFICATE OF CORRECTION

PATENT NO. : 7,333,238 B2
APPLICATION NO. : 10/402577
DATED : February 19, 2008
INVENTOR(S) : Bryce L. Anson Page 1 of 1

It is certified that error appears in the above-identified patent and that said Letters Patent is hereby corrected as shown below:

In column 4, line 30, delete "$2_x$" and insert -- $2^x$ --, therefor.

In column 8, line 61, in Claim 1, after "object" delete ":" and insert -- ; --, therefor.

In column 9, line 32, in Claim 10, after "of" insert -- printing --.

In column 10, line 30, in Claim 19, after "object" delete "to".

Signed and Sealed this

Twelfth Day of August, 2008

JON W. DUDAS
*Director of the United States Patent and Trademark Office*